(12) United States Patent
Kozuka

(10) Patent No.: US 6,473,538 B2
(45) Date of Patent: *Oct. 29, 2002

(54) IMAGE SENSOR

(75) Inventor: Hiraku Kozuka, Hiratsuka (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/251,302

(22) Filed: Feb. 17, 1999

(65) Prior Publication Data

US 2002/0044699 A1 Apr. 18, 2002

(30) Foreign Application Priority Data

Feb. 19, 1998 (JP) .......................... 10-037593
Feb. 19, 1998 (JP) .......................... 10-037594

(51) Int. Cl.[7] .............................. H04N 1/04; G06K 7/00
(52) U.S. Cl. ................... 382/312; 358/482; 358/483; 358/474
(58) Field of Search .................. 358/474, 475, 358/482, 483, 504; 382/312; 348/298, 294

(56) References Cited

U.S. PATENT DOCUMENTS

| | | | | |
|---|---|---|---|---|
| 4,620,236 A | * | 10/1986 | Tanaka ..................... | 358/293 |
| 5,198,654 A | | 3/1993 | Mukainakano et al. .. | 250/208.1 |
| 5,844,695 A | * | 12/1998 | Suzuki .................... | 358/475 |
| 5,990,503 A | * | 11/1999 | Ingram .................... | 257/236 |
| 6,072,588 A | * | 6/2000 | Dohnomae ............... | 358/1.9 |
| 6,198,506 B1 | * | 3/2001 | Nakata et al. ............. | 348/222 |
| 6,239,883 B1 | * | 5/2001 | Lam ........................ | 358/475 |

FOREIGN PATENT DOCUMENTS

| | | | |
|---|---|---|---|
| EP | 0382540 A2 | 8/1990 | ............ H04N/1/18 |
| EP | 0509492 A1 | 10/1992 | ............ H04N/3/15 |
| JP | 02-210949 | 8/1990 | ............ H04N/1/28 |
| JP | 02-210950 | 8/1990 | .......... H04N/5/335 |
| JP | 03149956 | * 6/1991 | ............ H04N/1/04 |
| JP | 04-004682 | 1/1992 | .......... H04N/5/335 |
| JP | 05227362 A | 9/1993 | ............ H04N/1/28 |
| JP | 05-227362 | 9/1993 | ............ H04N/1/28 |

OTHER PUBLICATIONS

Blouke et al.; Charge–Coupled Devices and Solid State Opitcal Sensors; Feb. 1995; SPEI Proceedings vol. 2415.*
Patent Abstracts of Japan; publication No.: 05227362; publication date: Mar. 9, 1993; title: Integrated circuit for close contact image sensor.

* cited by examiner

*Primary Examiner*—Jerome Grant
(74) *Attorney, Agent, or Firm*—Fitzpatrick, Cella, Harper & Scinto

(57) ABSTRACT

To obtain an excellent image signal, an image sensor having a plurality of photoelectric conversion devices each including a plurality of light-receiving elements includes a resolution switching circuit for switching a resolution of a signal read from the light-receiving element, a scanning circuit for reading a signal from the light-receiving element in accordance with the resolution switched by the resolution switching circuit, and a start timing control circuit for controlling a start timing from one of the photoelectric conversion devices to the next photoelectric conversion device in accordance with the resolution switched by the resolution switching circuit.

29 Claims, 13 Drawing Sheets

IMAGE SENSOR

BACKGROUND OF THE INVENTION

1. Field of the Invention

The present invention relates to an image sensor having a plurality of photoelectric conversion devices each including a plurality of light-receiving elements and a method of driving the same and, more particularly, to an image sensor having a resolution switching function and a method of driving the same, a photoelectric conversion device used in the image sensor, and an image reading apparatus such as an image scanner, facsimile apparatus, or electronic copying machine for reading a two-dimensional image.

2. Related Background Art

Recently, in the field of data processing systems, one-to-one type image sensors each having a plurality of semiconductor photosensor chips have been extensively developed as one-dimensional image readers in place of reduction-type line sensors each using a conventional optical system.

For example, Japanese Patent Application Laid-Open No. 5-227362 has proposed a contact-type image sensor which has a new resolution control terminal and allows the user to select a desired resolution in accordance with a use condition.

FIG. 1 is a circuit diagram of a contact-type image sensor integrated circuit proposed in Japanese Patent Application Laid-Open No. 5-227362. In this arrangement, a control terminal 125 is formed on an image sensor chip. The user inputs a signal of high or low level to this terminal to select a high or low resolution mode. This will be briefly described with reference to FIG. 7. A start pulse SI and a clock pulse CLK are supplied to a shift register group 104. When a shift register 104a is activated in response to the start pulse SI, its output is input to a channel select switch 103a via a NOR gate 121a and an AND gate 120a. The NOR and AND gates 121a and 120a are turned on to extract a signal from a photocell 101a to a signal line 107a. The remaining shift registers 104b to 104f are sequentially activated to output signals from photocells 101b to 101l to the signal line 107a or a signal line 107b.

When a control signal "H" is input to the control signal input terminal 125, analog switches 110a, 110b, 122a, and 122b are switched to obtain an image signal at an image output terminal 111 at a read density of 16 dots/mm. When a control signal "L" is input to the control signal input terminal 125, the analog switch 110a is always set in the ON state to obtain an image signal at the image output terminal 111 at a density of 8 dots/mm which is half the density of the photocells 101a to 101l. That is, although all the photocells 101a to 101l on the sensor IC are always operating, some outputs are thinned out by the control signal in externally extracting the output image signal. Therefore, the image signal voltage level is always kept constant, and a conventional arrangement can be used for the subsequent image processing circuit.

To meet high-speed operation, for example, Japanese Patent Application Laid-Open No. 2-210950 has proposed an image sensor chip having a means for delaying a start signal, and a contact-type image sensor using this image sensor chip. A constant current circuit is started before a sensor signal is read to achieve a high-speed read. More specifically, there are provided an image sensor chip used in a multichip photoelectric conversion device obtained by arranging a plurality of image sensor chips having light-receiving elements, and a photoelectric conversion device using this image sensor chip, characterized in that a delay means for delaying a start signal for light signal read operation using the light-receiving elements and a constant current circuit having a signal used for the start signal for the image sensor chip and arranged in an amplifier circuit for amplifying the light signal read signal using the light-receiving elements are turned on before the end of the light signal read operation in accordance with a start signal representing the start of delay of the delay means.

Japanese Patent Application Laid-Open No. 2-210949 discloses a one-chip arrangement used in Japanese Patent Application Laid-Open No. 2-210950. More specifically, this reference has proposed an image sensor chip for driving a shift register using an internal clock Φ1 synchronous with high level of a clock signal and an internal clock Φ2 synchronous with low level of the clock signal, and a contact-type image sensor using this image sensor chip, thereby realizing a high-speed read at a duty ratio of 100%.

FIG. 2 is an equivalent circuit diagram of an image sensor chip assumed from the contents described in Japanese Patent Application Laid-Open Nos. 2-210949 and 2-210950.

Referring to FIG. 2, a plurality of photoelectric conversion devices 1, 1', and 1" are mounted on the image sensor chip, and a clock CLK and start pulse SP for driving each photoelectric conversion device are commonly supplied to the photoelectric conversion devices 1, 1', and 1". The photoelectric conversion devices 1, 1', and 1" respectively comprise N-bit delay means (n-bit preshift registers 2, 2', and 2"), k-bit shift registers 3, 3', and 3", k-bit light-receiving element arrays 4, 4', and 4", timing generation circuits 5, 5', and 5", and signal output amplifiers 6, 6', and 6".

Next-chip start signals 9, 9', and 9" output signals N bits ((K-N)th bit) before the end of read by bits of the photoelectric conversion devices as the start signals for the next chips from the bit position N bits before the last register of the shift registers 3, 3', and 3".

The timing generation circuits 5, 5', and 5" driven by the clock CLK and the start pulse signal SP generate pulses for driving the light-receiving elements 4, 4', and 4", and the drive pulses Φ1 (7, 7', and 7") and Φ2 (8, 8', and 8") for driving the shift registers 3, 3', and 3". The start pulse signal SP is commonly supplied to the respective image sensor chips so as to synchronize the start of operations of the respective image sensor chips.

The signal output amplifiers 6, 6', and 6" amplify image signals read from the light-receiving element arrays 4, 4', and 4" onto a single signal output line via switches which are turned on/off in accordance with shift signals from the shift registers. The amplified signals are converted into signal outputs Vout in accordance with the control signal from the timing generation circuits 5, 5', and 5". Constant current circuits are arranged in the signal output amplifiers 6, 6', and 6" and receive the voltage simultaneously with the input of the start signal. The constant current circuits allow the amplifiers to perform steady amplification operations when the clock signals each succeeding N bits from the start signal are input.

FIG. 3 is a timing chart of the drive pulses Φ1 (7, 7', and 7") and Φ2 (8, 8', and 8") for the shift register 3 with reference to the clock CLK.

Note that FIG. 3 shows the timings when the delay means in FIG. 2 has a 4-bit arrangement. The operation of the first one of the shift register 3, 3', or 3" starts with a delay of 4 bits from the start pulse signal SP.

As shown in FIG. 3, the drive pulse Φ1 (7, 7', and 7") is synchronized with high level of the clock CLK, while the drive pulse Φ2 (8, 8', and 8") is synchronized with low level of the clock CLK. The signal output Vout is extracted in synchronism with the drive pulses Φ1, and Φ2. When the first bit of the shift register 3 corresponds to the drive pulse Φ1, the odd- and even-numbered bits of the signal output are synchronized with the drive pulses Φ1 and Φ2, respectively.

Signals A, C, and E are signal outputs from the photoelectric conversion devices 1, 1', and 1", respectively. The signal output Vout as the sum of the signals A, B, and C is shown in FIG. 3. The signals each four bits before the last bit in each photoelectric conversion element are output as start signals B and D of the subsequent photoelectric conversion devices.

A large original can be directly read as a multichip contact-type image sensor to eliminate idle times between read operations of the chips and differences between signal output levels.

In the resolution switching scheme of the contact-type image sensor shown in FIG. 1, pixels are skipped in a read to change the resolution. For example, when the clock rate is kept unchanged, the read time with the normal resolution is equal to that with ½ the normal resolution. Assume that the light-receiving elements are arranged at an optical resolution of 600 dpi, and 600 dpi and 300 dpi are set in the high and low resolution modes, respectively. when a read rate of 6 msec/line is set at 600 dpi, the read rate at 300 dpi is also 6 msec/line. The read rate is kept unchanged even with a decrease in resolution. The read rate does not change depending on the resolution at the same clock rate, i.e., the read rates of 5 msec/line at 600 dpi and 3 msec/line at 300 dpi cannot be realized at the same clock rate.

Since the signal output lines for odd and even bits are separate, the level difference between the even and odd bits tends to occur.

When the resolution switching technique shown in FIG. 1 is applied to the contact-type image sensor shown in the arrangement shown in FIG. 2, discontinuities are formed between the joint portions of the photoelectric conversion devices in switching the resolution.

In the arrangement shown in FIG. 2, when the number of bits of a preshift register is, e.g., 10, the output of the first bit of the next photoelectric conversion device is output 10 bits after the output of the next-chip start signal in the high resolution mode. In this case, the signal is not discontinuous in the joint portion between the adjacent photoelectric conversion apparatuses. In the low resolution mode, since the signal output ends 5 bits after the next-chip start signal is output, a discontinuous portion of 5 bits is formed in the joint portion between the adjacent photoelectric conversion devices until the output of the first bit of the next photoelectric conversion device appears. It is difficult to obtain continuous image signals at high and low resolutions even if the arrangement in FIG. 2 is used for the arrangement in FIG. 1.

SUMMARY OF THE INVENTION

It is an object of the present invention to provide an image sensor which has a plurality of photoelectric conversion devices each including a plurality of light-receiving elements, can attain the read rate corresponding to the resolution and is free from discontinuity at a joint portion between the adjacent photoelectric conversion devices, a photoelectric conversion device suitable for the image sensor, an image sensor driving method, and an image reading apparatus using the image sensor.

In order to achieve the above object, according to an aspect of the present invention, there is provided an image sensor having a plurality of photoelectric conversion devices each including a plurality of light-receiving elements, comprising scanning means for reading a signal from the light-receiving element; delay means for delaying a start signal of the scanning means; resolution switching means for switching a resolution of a signal read from the light-receiving element; start signal output means for outputting a plurality of types of start signals for the scanning means of the next photoelectric conversion device before an end of read operation of the scanning means in accordance with switching of the resolution switching means; and start signal switching means for switching the plurality of start signal output means.

According to another aspect of the present invention, there is provided a method of driving an image sensor including a plurality of photoelectric conversion devices each having a plurality of light-receiving elements, scanning means for reading a signal from the light-receiving element, and resolution switching means for switching a resolution of the signal read from the light-receiving element, comprising a step of outputting a start signal for the scanning means of the next photoelectric conversion device before an end of read operation of the scanning means in accordance with a resolution.

According to still another aspect of the present invention, there is provided an image sensor having a plurality of photoelectric conversion devices each including a plurality of light-receiving elements, comprising resolution switching means for switching a resolution of a signal read from the light-receiving element; scanning means for reading a signal from the light-receiving element in accordance with the resolution switched by the resolution switching means; and start timing control means for controlling a start timing from one of the photoelectric conversion devices to the next photoelectric conversion device in accordance with the resolution.

According to still another aspect of the present invention, there is provided a photoelectric conversion device having a plurality of light-receiving elements, scanning means for reading a signal from the light-receiving element, and resolution switching means for switching a resolution of the signal read from the light-receiving element, wherein a start signal is output as a read timing signal in accordance with a read timing of a predetermined light-receiving element before a last read light-receiving element of the plurality of light-receiving elements, and the read timing is switched in accordance with switching of the resolution.

According to still another aspect of the present invention, there is provided a photoelectric conversion device comprising a light-receiving element array in which a plurality of light-receiving elements are arranged, scanning means driven by a first shift register drive pulse for reading a signal from an odd-numbered light-receiving element of the light-receiving element array and a second shift register drive pulse for reading a signal from an even-numbered light-receiving element of the light-receiving element array, and resolution switching means for switching the resolution for each 1/N (N is a natural number), wherein the number of the plurality of light-receiving elements is a multiple of 2N.

According to still another aspect of the present invention, there is provided an image sensor comprising a plurality of photoelectric conversion devices each including a light-receiving element array in which a plurality of light-receiving elements are arranged, scanning means driven by a first shift register drive pulse for reading a signal from an odd-numbered light-receiving element of the light-receiving element array and a second shift register drive pulse for reading a signal from an even-numbered light-receiving element of the light-receiving element array, and resolution switching means for switching the resolution for each 1/N (N is a natural number), wherein the number of the plurality of light-receiving elements is a multiple of 2N.

According to still another aspect of the present invention, there is provided an image sensor having a plurality of photoelectric conversion devices each including a plurality of light-receiving elements, comprising resolution switching means for switching a resolution; control means, respectively, arranged in the photoelectric conversion devices, for changing signal read from the light-receiving element in accordance with the resolution switched by the resolution switching means; and signal read means for reading the signal from the light-receiving element in accordance with a plurality of pulses, wherein the signal read means periodically drives the plurality of pulses, and the number of light-receiving elements is set so that a signal read first from each of the signal read means in each photoelectric conversion device is read using the same pulse of the plurality of pulses.

According to still another aspect of the present invention, there is provided an image sensor having a plurality of photoelectric conversion devices each including a plurality of light-receiving elements, comprising resolution switching means for switching a plurality of resolutions changing every 1/N; control means for changing a signal read from the light-receiving element in accordance with a resolution switched by the resolution switching means; and signal read means for reading the signal from the light-receiving element in accordance with M (positive integer) shift register drive pulses, wherein the number of the plurality of light-receiving elements is a multiple of M×N.

The above and other objects, features, and advantages of the present invention will be apparent from the detailed description of preferred embodiments in conjunction with the accompanying drawings.

DESCRIPTION OF THE PREFERRED EMBODIMENTS

The preferred embodiments of the present invention will be described in detail with reference to the accompanying drawings.

Figure 1:
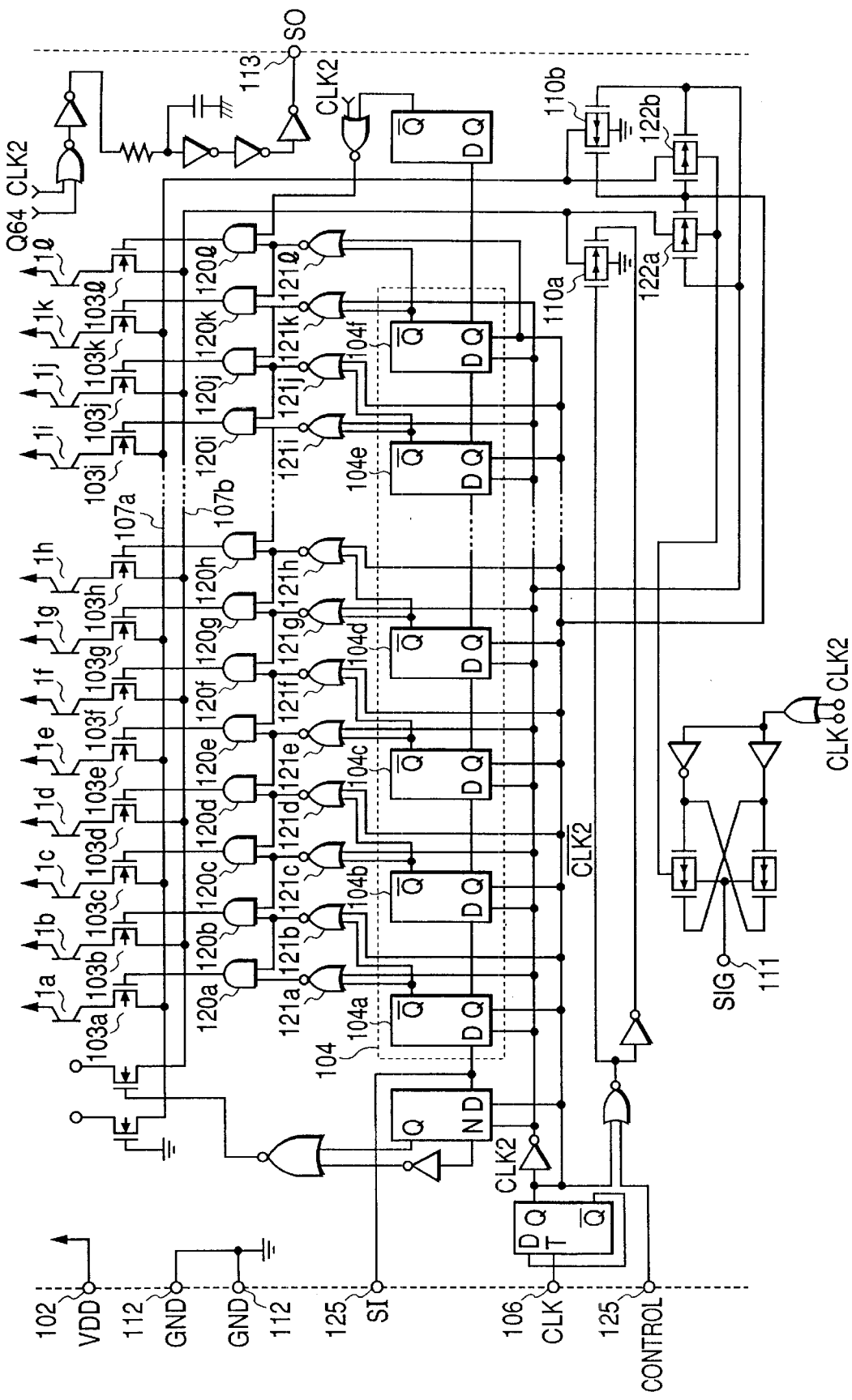
FIG. 1 is a circuit diagram of a contact-type image sensor integrated circuit shown in association with the present invention.
Figure 2:
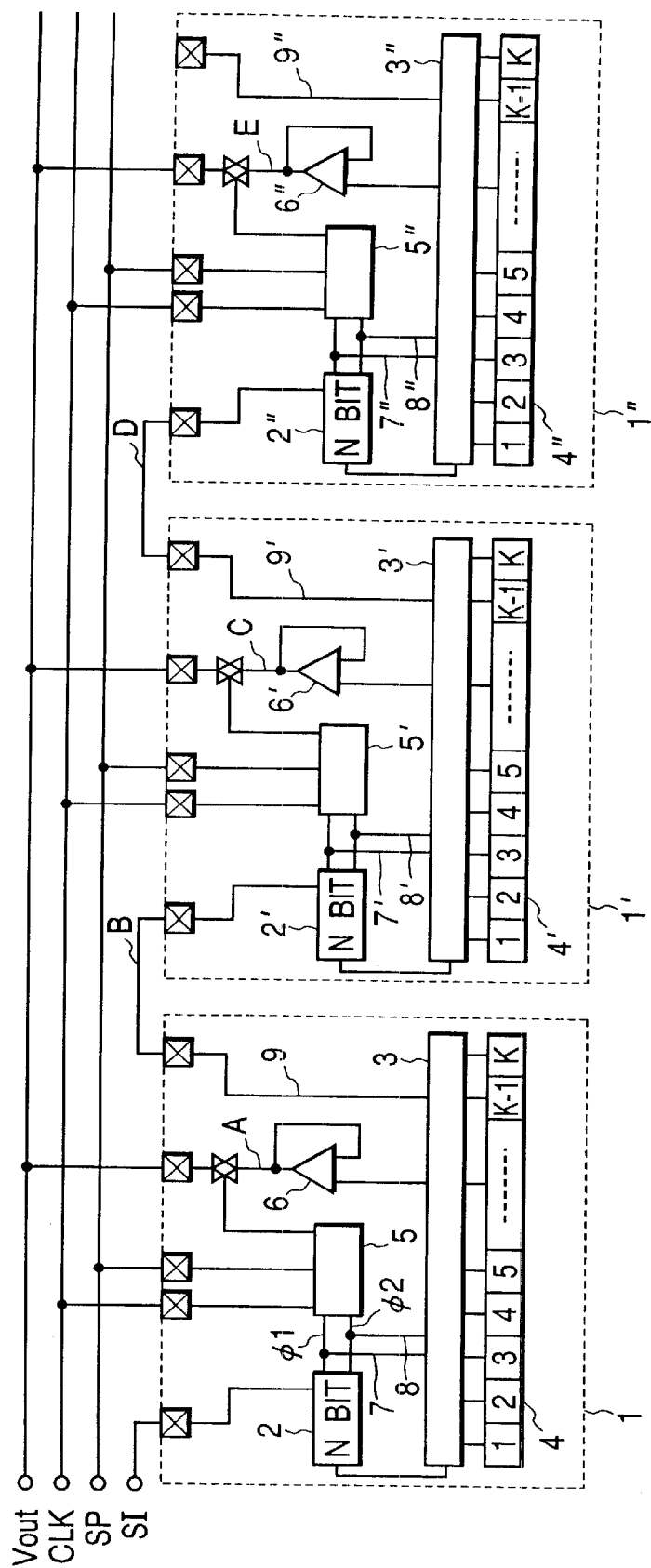
FIG. 2 is an equivalent circuit diagram of an image sensor chip shown in association with the present invention.
Figure 3:
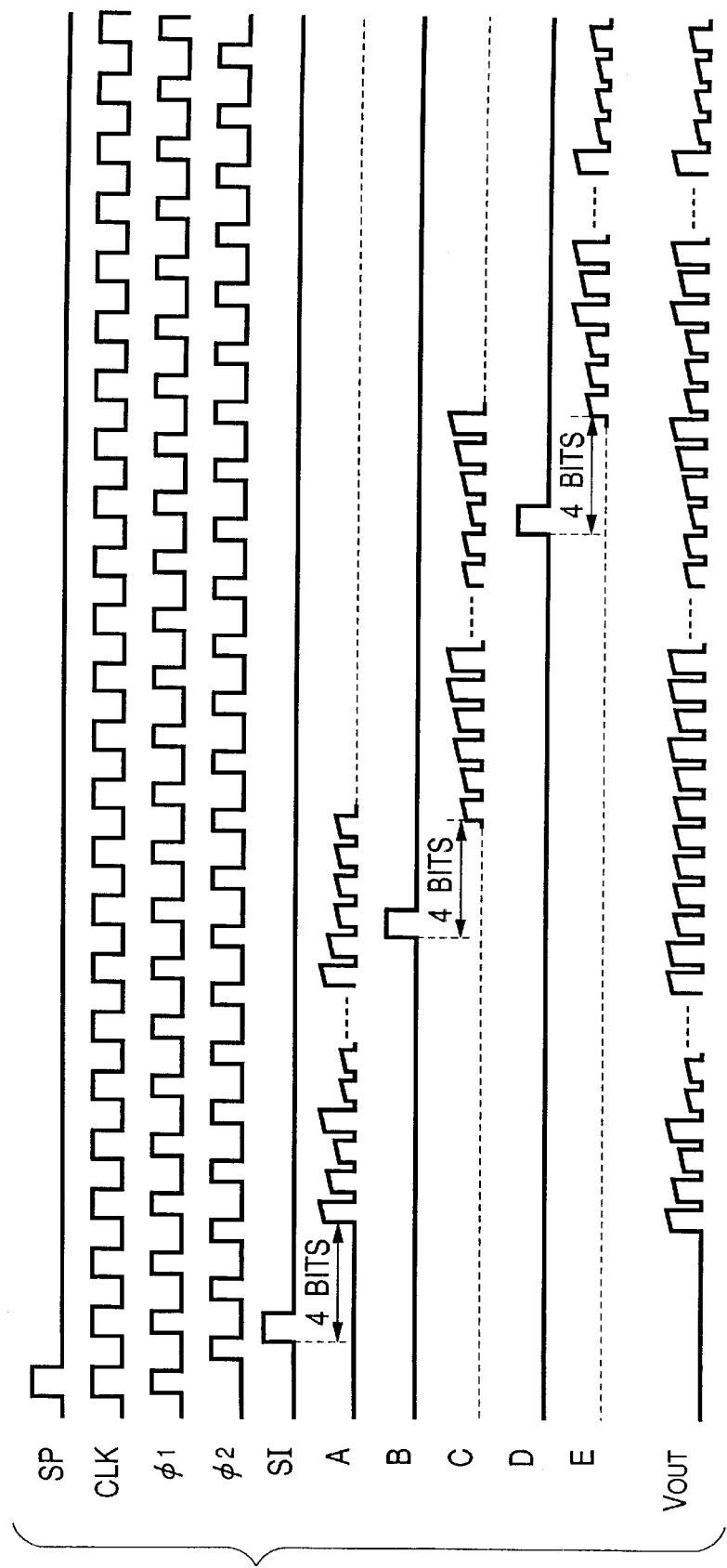
FIG. 3 is a timing chart in the arrangement of FIG. 2.
Figure 4:
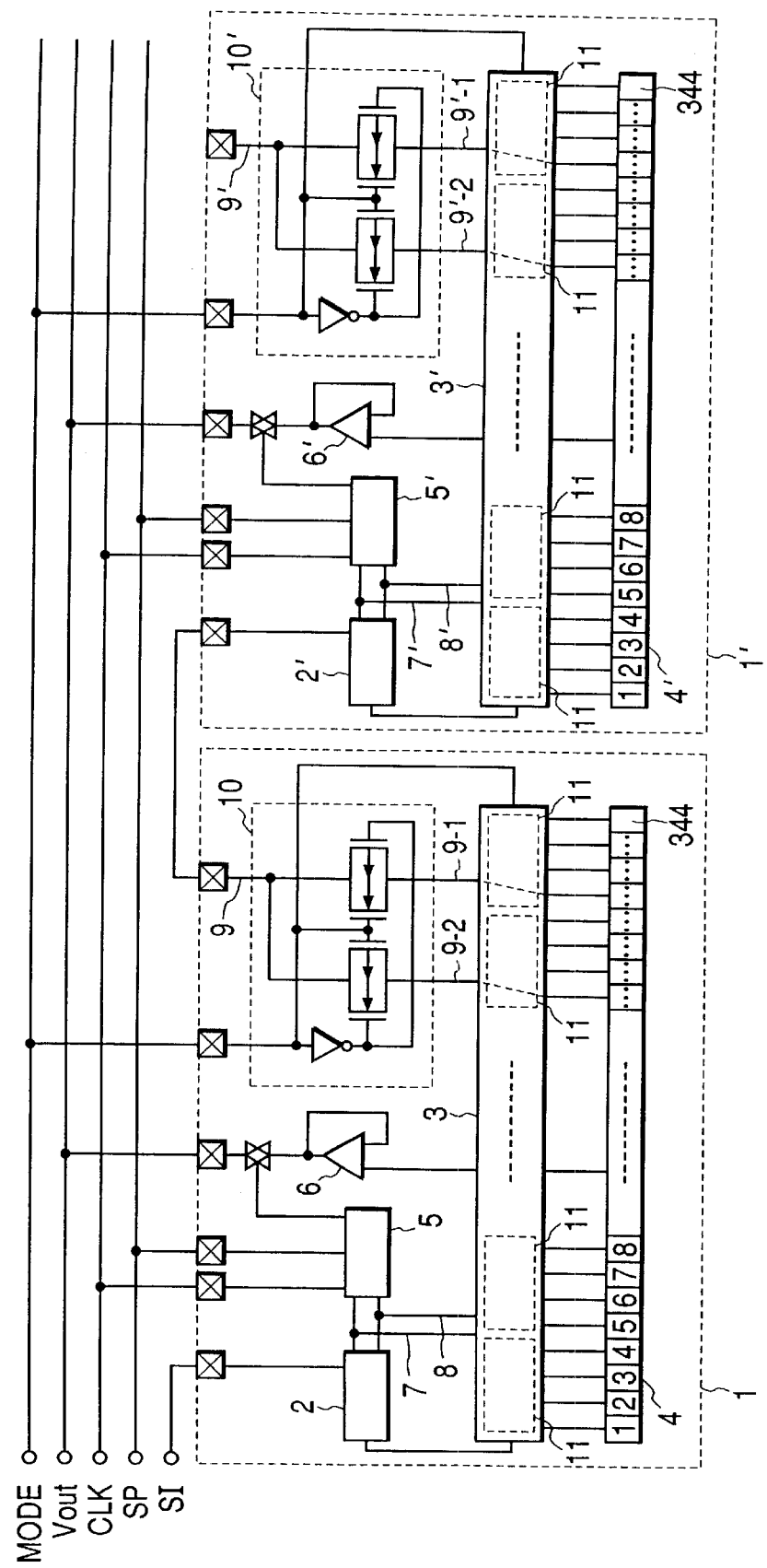
FIG. 4 is a block diagram of an image sensor according to the first embodiment of the present invention.
Figure 5:
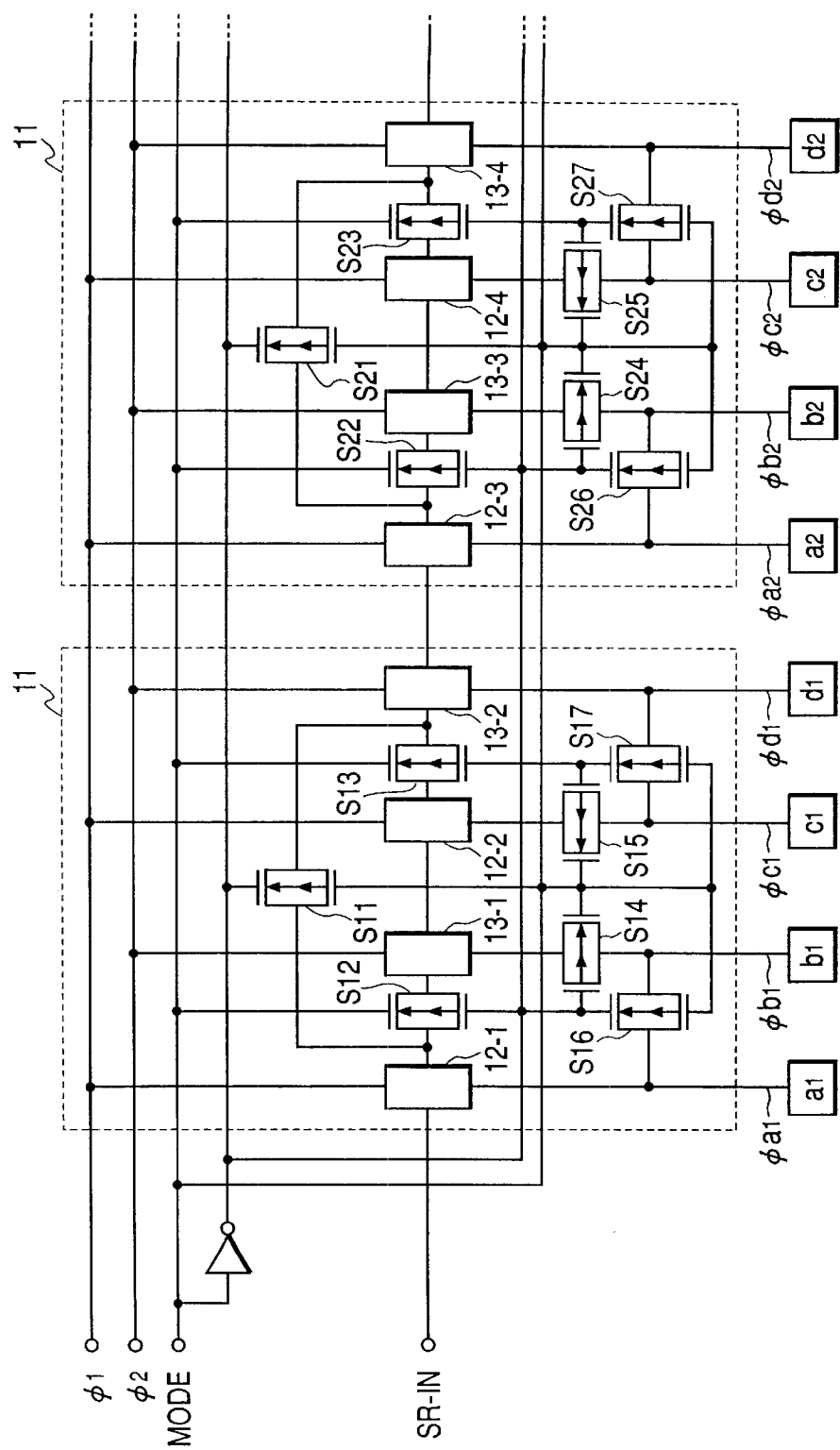
FIG. 5 is a block diagram of shift registers and light-receiving elements, which correspond to 8 bits in this embodiment.
Figure 6:
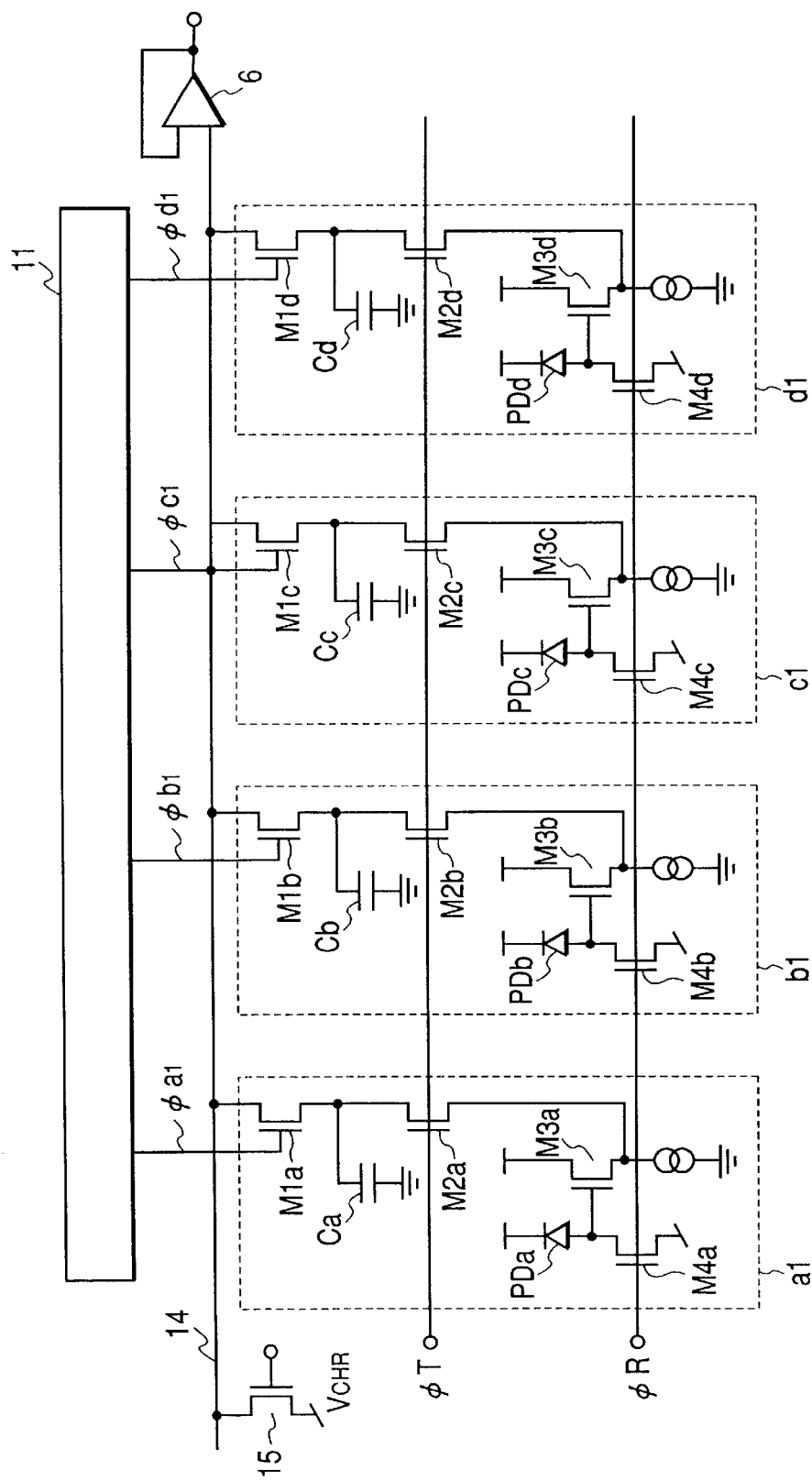
FIG. 6 is an equivalent circuit diagram (4 pixels) of light-receiving elements of this embodiment.
Figure 7:
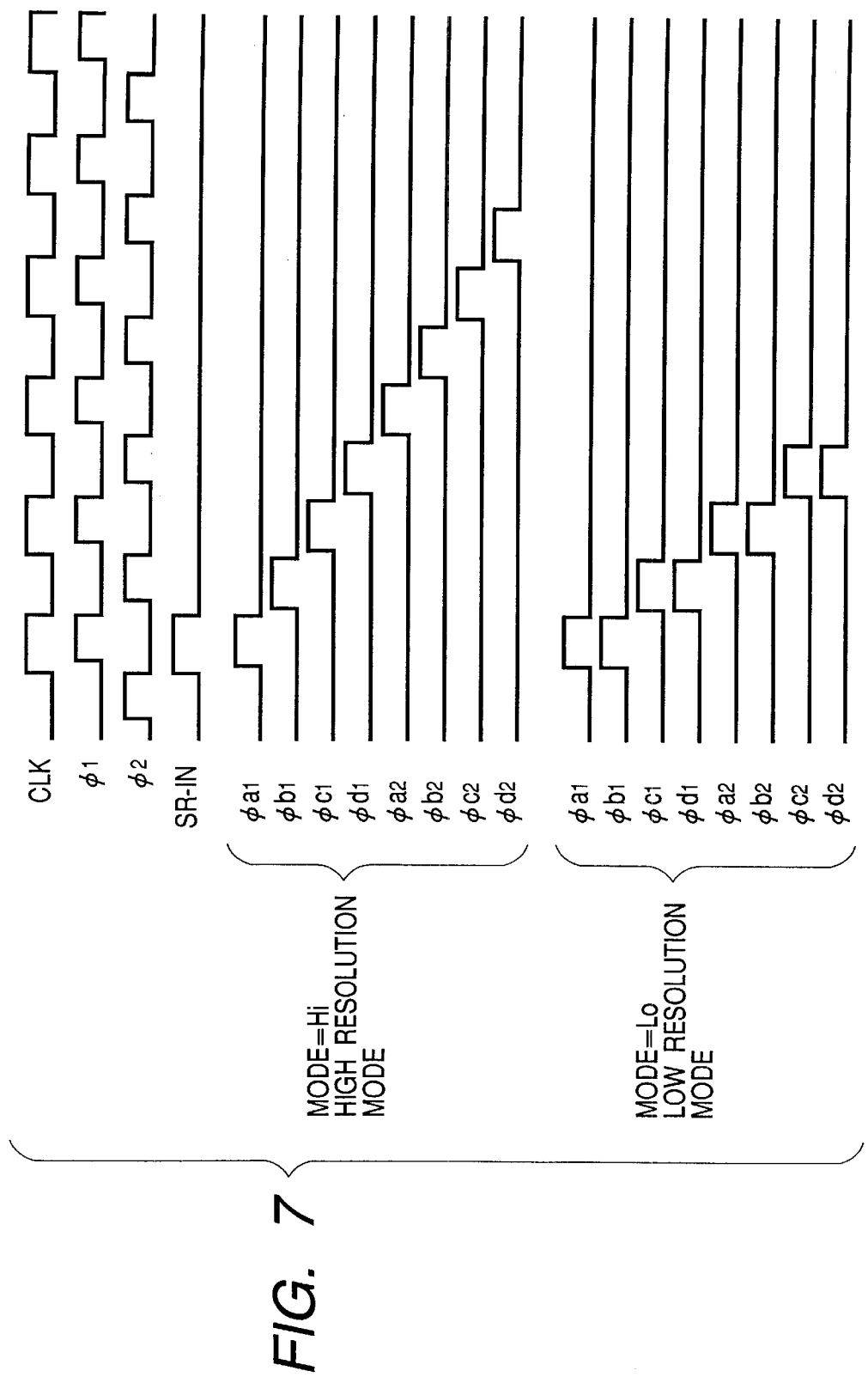
FIG. 7 is a timing chart showing operation of this embodiment.

FIG. 4 is a block diagram of an image sensor using a photoelectric conversion element according to the first embodiment of the present invention, FIG. 5 is a block diagram of shift registers and light-receiving elements, which correspond to 8 bits in FIG. 4, FIG. 7 is a timing chart showing operation of FIG. 5, and FIG. 6 is an equivalent circuit diagram of light-receiving elements of four pixels.

Referring to FIG. 4, a plurality of photoelectric conversion devices 1 and 1' are mounted to form an image sensor. Only two chips are illustrated in FIG. 4, but actually 15 chips are arrayed in a line to form an image sensor in this embodiment.

A clock CLK, start pulse SP, and resolution switching signal MODE, which drive the photoelectric conversion devices, are commonly supplied to the photoelectric conversion devices 1 and 1'.

In this embodiment, when the signal MODE is at high level, a high resolution mode (600 dpi) is set. When the signal MODE is at low level, a low resolution mode (300 dpi) is set.

The photoelectric conversion devices 1 and 1' respectively comprise preshift registers 2 and 2' each having a 4-bit delay, shift registers 3 and 3', 344-bit light-receiving element arrays 4 and 4', timing generation circuits 5 and 5', and signal output amplifies 6 and 6'. Each of the shift registers 3 and 3' comprises a 4-bit shift register block 11.

Start signals 9-1 and 9'-1 in the high resolution mode and start signals 9-2 and 9'-2 in the low resolution mode are selected using start signal switching means 10 and 10' to obtain next-chip start signals 9 and 9'.

The switching means 10 for switching the next-chip start signals 9 and 9' may be arranged not only on the chip at the start signal transmission side for outputting the next-chip start signals 9 and 9' to the next chips, but also on the chip at the start signal receiving side for the start signals output from the next-chip start signal switching means 10 after a plurality of start signals are output to the next chips. In the low resolution mode, the outputs from the two adjacent pixels may be added and read, or the outputs from, e.g., even-bit pixels may be thinned out and the remaining outputs are read.

FIG. 5 is a block diagram of shift registers and light-receiving elements, which correspond to 8 bits. A shift register comprises the shift register block 11 having 4 bits. The shift register block 11 comprises Φ1-synchronous 1-bit shift registers 12-1 to 12-4, Φ2-synchronous 1-bit shift registers 13-1 to 13-4, and mode signal switching analog switches S11 to S27.

The shift register block 11 is connected to light-receiving elements a1 to d2 via read pulse lines Φa1 to Φd2.

FIG. 6 shows an equivalent circuit of 4-pixel light-receiving elements in FIG. 5. The light-receiving elements a1 to d1 respectively comprise photodiodes PDa to PDd serving as photoelectric conversion means, read switches M1a to M1d, signal transfer switches M2a to M2d, MOS source followers M3a to M3d, reset switches M4a to M4d serving as means for resetting the photoelectric conversion means, and storage capacitors Ca to Cd for temporarily storing the charges.

The operation of this embodiment will be described below.

In the light-receiving elements a1 to d1 shown in FIG. 6, photocarriers generated by photoelectric conversion by the photodiodes PDa to PDd are converted into voltages by the MOS source followers M3a to M3d, and the voltages of all the pixels are collectively transferred to the storage capacitors Ca to Cd in response to a signal transfer pulse ΦT. The read switches M1a to M1d are sequentially turned on in accordance with read pulses Φa1 to Φd1 sequentially changed to high level from the shift register 11. The signal voltages are capacitively divided and read onto the common signal line 14.

In this embodiment, the read pulses Φa1 to Φd1 are sequentially enabled in the high resolution mode. In the low resolution mode, the two adjacent bits, i.e., the pulses Φa1 and Φb1 scanned from the shift register 11 are simultaneously enabled, and then the pulses Φc1 and Φd1 are simultaneously enabled. In the low resolution mode, the charges of the two pixels are capacitively divided and added to allow the signal voltage to be higher than that in the high resolution mode. Note that the capacitive division and addition technique is disclosed in, e.g., Japanese Laid-Open Patent Application No. 4-4682.

The operation of the shift register unit will be described with reference to FIGS. 5 and 6.

Referring to FIG. 5, when the signal MODE is at high level, the analog switches S11, S21, S16, S17, S26, and S27 are set in the OFF state, while the analog switches S12, S13, S14, S15, S22, S23, S24, and S25 are set in the ON state. The normal shift register operation having no resolution switching is performed. The read control pulses Φa1 to Φd2 for the light-receiving elements are sequentially enabled in a time-series manner. Referring to FIG. 5, although the image signal output line is not illustrated, light reception charges are output from the light-receiving elements a1 to d2 onto an output line in synchronism with timings at which the control pulses Φa1 to Φd2 sequentially change to high level.

When the signal MODE is at low level, the analog switches S11, S21, S16, S17, S26, and S27 are set in the ON state, while the analog switches S12, S13, S14, S15, S22, S23, S24, and S25 are set in the OFF state. When a shift pulse is input to the shift register 12-1, the shift register 12-1 outputs the pulses Φa1 and Φb1 in synchronism with the clock Φ1 to simultaneously read the signals from the light-receiving elements a1 and b1. The shift pulse is then input to the shift register 13-2 via the analog switch S11 to output the pulses Φc1 and Φd1 in synchronism with the clock Φ2, thereby simultaneously reading the signals from the light-receiving elements c1 and d1. In the low resolution read mode, the sums of the pairs of light-receiving elements a1 and b1, c1 and d1, a2 and b2, c2 and d2, . . . are sequentially output to an output line (not shown).

At this time, the shift registers 13-1 and 12-2 are kept off because no shift pulses are input to them. Similarly, the pulses Φa2 and Φb2 are output from the shift register 12-3 in synchronism with the clock Φ1. The signals from the light-receiving elements a2 and b2 are simultaneously read. The pulses Φc2 and Φd2 are output from with the shift register 13-4 in synchronism the clock Φ2 to simultaneously read the signals from the light-receiving elements c2 and d2.

The timing chart of the above operation is shown in FIG. 7. Referring to FIG. 7, the clock signal CLK and the sync signals Φ1 and Φ2 are commonly supplied in the high and low resolution modes. The start signal SR of the shift register is set at high level, and image signal output in the high and low resolution modes are obtained. At the same clock rate, the read rate in the low resolution mode can be twice that in the high resolution mode.

The next-chip start signal switching means will be described below.

Referring to FIG. 4, since each of the preshift registers 2 and 2' has a 4-bit delay, a signal ahead of 4 bits must be output as a start signal for the next chip. The preshift registers 2 and 2' eliminate time adjustment from the start signal SP. A continuous image signal without any discontinuity from the previous photoelectric conversion device can be obtained at the same timing as the completion of the read of the preceding photoelectric conversion device. In the high resolution mode, each of the photoelectric conversion devices 1 and 1' has a 344-bit signal. The 341st shift register signals 9-1 and 9'-1 are used as the start signals as the next-chip start signals.

In the resolution mode, since the sum signal of the two pixels serves as one bit, each of the photoelectric conversion devices 1 and 1' equivalently has a 177-bit signal. The 337th bit shift register signals 9-2 and 9'-2 figured out in the light-receiving elements are used as the next-chip start signals. That is, even if the start signal switching means for switching the next-chip start signals is arranged to switch the resolution, the image signal can maintain continuity at the joint portion of the photoelectric conversion devices.

In the above embodiment, although the number of bits of each photoelectric conversion device is set to 344, any number of bits can be employed if it is a multiple of 4.

The resolutions in the "high and low resolution modes" are not limited to "600 dpi and 300 dpi". They may be "400 dpi and 200 dpi".

The ratio of the resolution in the high resolution mode to that in the low resolution mode is 2:1. However, if six pixels define one block and the number of pixels of a photoelectric conversion device is set to a multiple of 6, the resolution ratio can be 3:1 such as switching between "600 dpi and 200 dpi".

Figure 8:
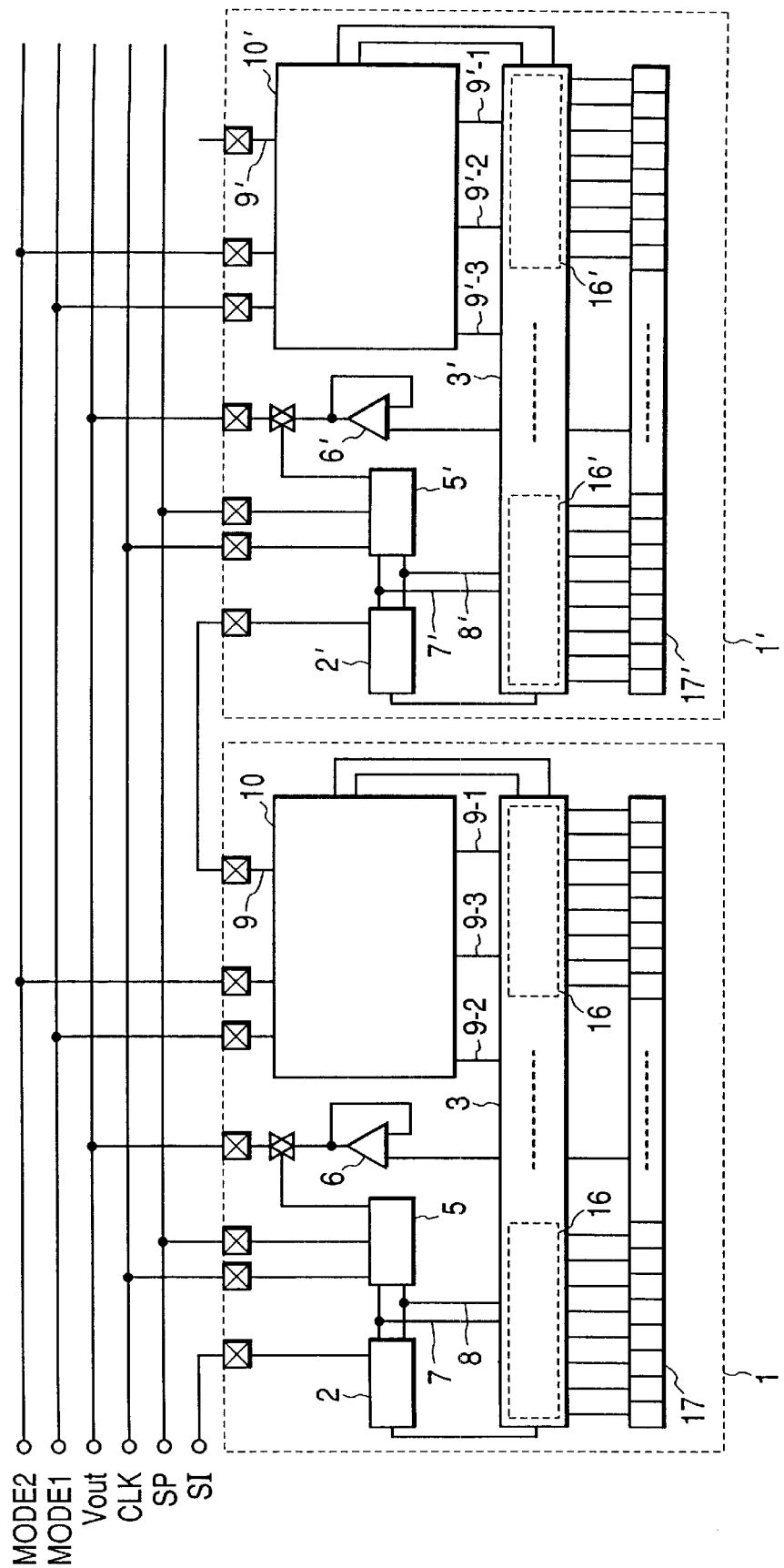
FIG. 8 is a block diagram of an image sensor using photoelectric conversion devices according to the second embodiment of the present invention.

FIG. 8 is a block diagram of an image sensor using the photoelectric conversion device of the second embodiment of the present invention.

In this embodiment, a resolution control terminal MODE2 is added to the arrangement of the first embodiment to allow switching between three resolutions, i.e., high resolution mode (1,200 dpi), intermediate resolution mode (600 dpi), and low resolution mode (300 dpi). The number of resolutions is merely an example and can be arbitrarily set.

Referring to FIG. 8, photoelectric conversion devices 1 and 1' respectively comprise preshift registers 2 and 2' each having a 4-bit delay, shift registers 3 and 3' for sequentially reading light signals, 688-bit light-receiving element arrays 17 and 17', timing generation circuits 5 and 5', and shift output amplifiers 6 and 6'. Each of the shift registers 3 and 3' comprises an 8-bit shift register block 16. High resolution mode start signals 9-1 and 9'-1, intermediate resolution mode start signals 9-3 and 9'-3, and low resolution mode start signals 9-2 and 9'-2 are selected using start signal switching means 10 and 10' to obtain next-chip start signals 9 and 9'.

Figure 9:
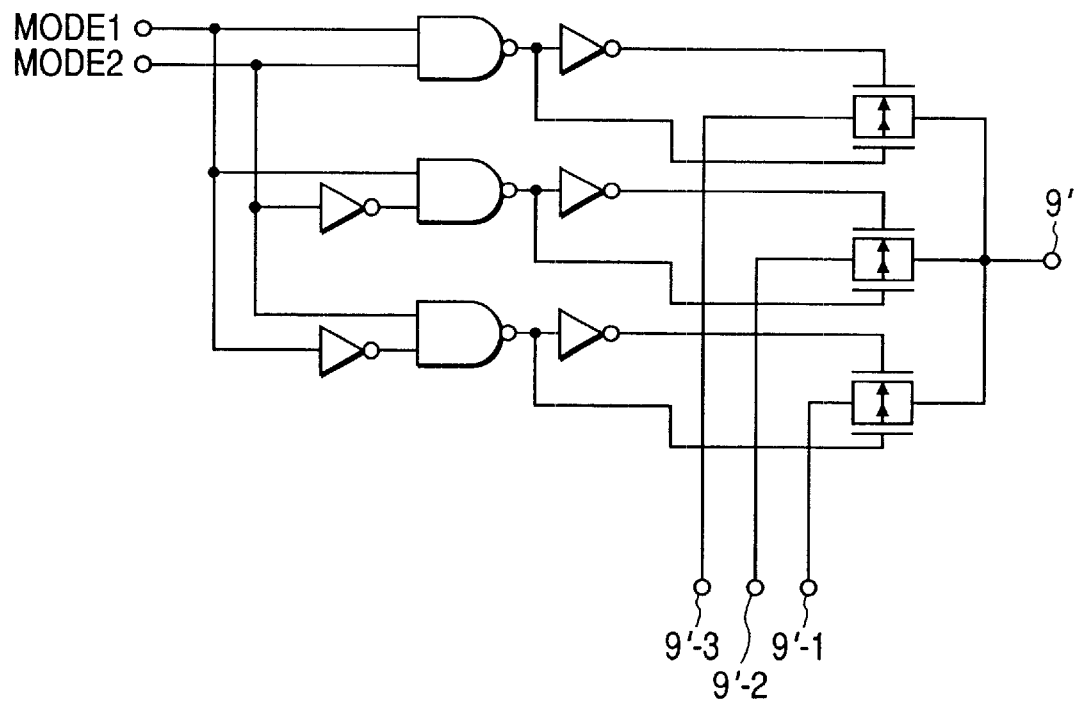
FIG. 9 is a circuit diagram of a start signal switching circuit according to the second embodiment.

FIG. 9 is a schematic view of the start signal switching circuit 10, showing an arrangement which can obtain the next-chip start signals 9 and 9' corresponding to the high resolution mode start signals 9-1 and 9'-1, the intermediate resolution mode start signals 9-3 and 9'-3, or the low resolution mode start signals 9-2 and 9'-2. As in this embodiment, the switching circuit 10 can select and output three different signals from the two signals MODE1 and MODE2. Various logic circuits can be employed, and a detailed description thereof will be omitted.

The switching means 10 for switching the next-chip start signals 9 and 9' may be arranged not only on the chip for outputting the signal to the next stage, but also on the chip for receiving the start signals upon output of the plurality of start signals to the next stage. In the low resolution read mode, the outputs from the two adjacent chips are added, and the sum is output. Alternatively, outputs from the pixels of even-numbered bits may be thinned out, and the remaining signals may be output.

In this embodiment, one pixel corresponds to one bit in the high resolution mode, two pixels correspond to one bit by adding the outputs from the two pixels in the intermediate resolution mode, and four pixels correspond to one bit by adding outputs from the four pixels in the low resolution mode. The shift register 16 has one block composed of eight pixels and can be arranged in the same manner as in the first embodiment.

As shown in the second embodiment, according to the present invention, the number of resolution modes can be set to three or more. The read rates corresponding to the resolutions can be realized. No discontinuity occurs in the signal at the joint portion between the adjacent photoelectric conversion devices.

As described above, in the first and second embodiments, two shift register drive pulses are used. When the resolution is changed every 1/N, the number of light-receiving elements of each photoelectric conversion device is a multiple of 2N.

In the first and second embodiments, the two different shift register drive pulses are used. The present invention, however, is not limited to this. For example, three different shift register drive pulses may be used. In this case, when the resolution decreases, the outputs from the light-receiving elements are added and read using three adjacent multiples. That is, in driving the shift registers using M shift register drive pulses, when a plurality of resolutions changing every 1/N are used, the number of light-receiving elements can be a multiple of M×N.

The present invention is applicable not only to a one-dimensional photoelectric conversion device but also to a two-dimensional photoelectric conversion device. When the present invention is applied to the two-dimensional photoelectric conversion device, horizontal resolution switching and vertical resolution switching can also be realized in addition to the resolution switching in pixel level.

As described above, in the first and second embodiments, a signal will not be discontinuous at the joint portion between the photoelectric conversion devices in resolution switching. Read rates corresponding to resolutions can be obtained, thus providing great technological advantages.

An embodiment in which an image sensor of the present invention is applied to an image reading apparatus having a communication function and the like will be described as the third embodiment of the present invention with reference to FIGS. 10 and 11.

Figure 10:
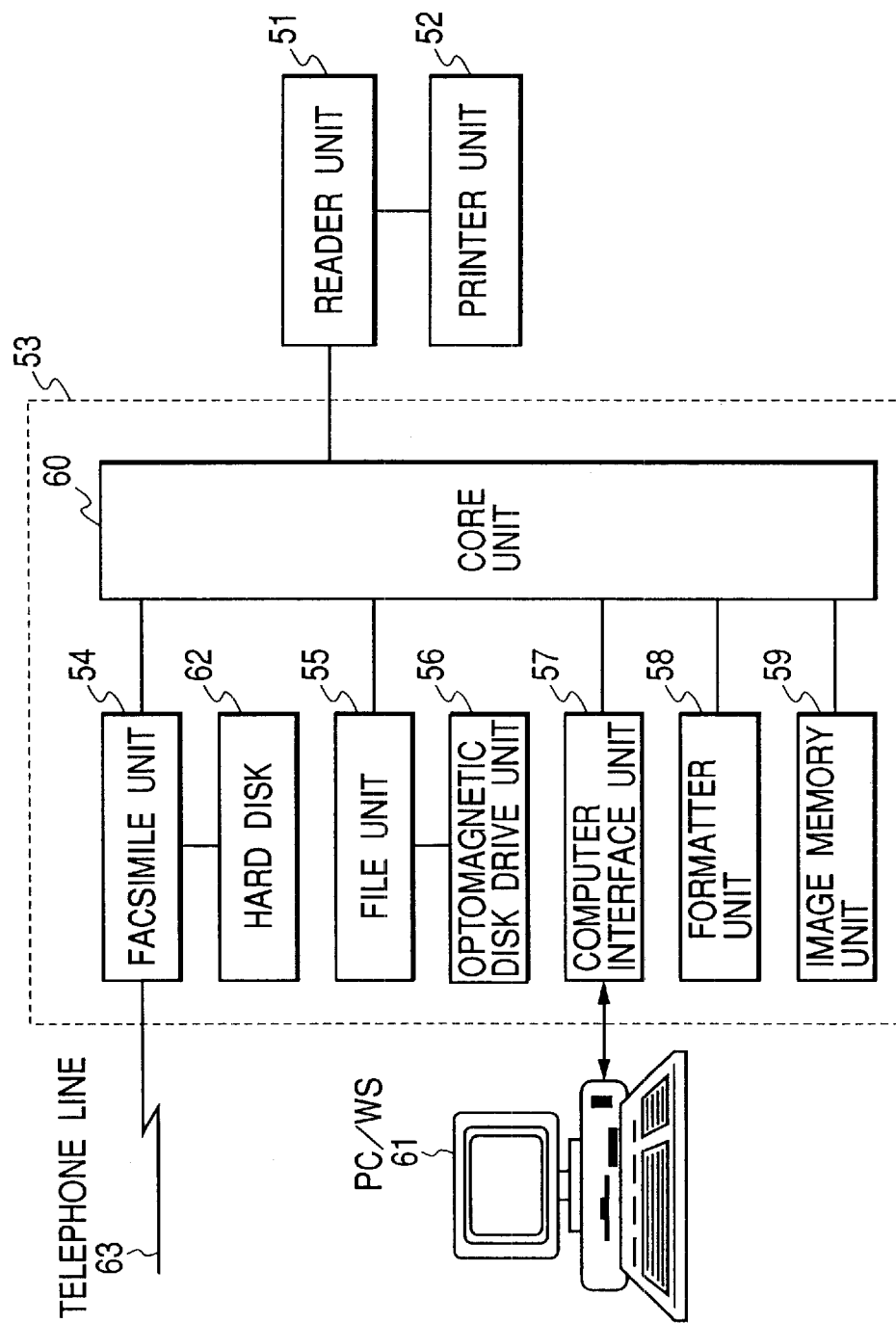
FIG. 10 is a diagram showing an image reading apparatus using an image sensor of the third embodiment.

FIG. 10 is a block diagram showing the arrangement of the image processing unit of the image reading apparatus. Referring to FIG. 10, a reader unit 51 reads an original image (not shown) and outputs image data corresponding to the original image to a printer unit 52 and an image input/output control unit 53. The printer unit 52 prints, on printing paper, an image represented by the image data from the reader unit 51 and the image input/output control unit 53.

The image input/output control unit 53 is connected to the reader unit 51 and comprises a facsimile unit 54, a file unit 55, a computer interface unit 57, a formatter unit 58, an image memory unit 59, and a core unit 60. Of these components, the facsimile unit 54 expands the compressed image data received via a telephone line 63 and transfers the expanded image data to the core unit 60. The facsimile unit 54 compresses image data transferred from the core unit 60 and transmits the compressed image data to the telephone line 63. The facsimile unit 54 is connected to a hard disk 62. The hard disk 62 temporarily stores the received compressed image data.

The file unit 55 is connected to a magnetooptic disk drive unit 56. The file unit 55 compresses image data transferred from the core unit 60 and stores the image data in a magnetooptic disk set in the magnetooptic disk drive unit 56 together with a keyword for searching for this image data. The file unit 55 searches the magnetooptic disk for the compressed image data on the basis of the keyword transferred via the core unit 60. The file unit 55 reads out the searched compressed image data, expands it, and transfers the expanded image data to the core unit 60.

The computer interface unit 57 interfaces between the core unit 60 and a personal computer or workstation (PC/WS) 61. The formatter unit 58 converts code data representing the image transferred from the PC/WS 61 into bitmap image data which can be printed at the printer unit 52. The image memory unit 59 temporarily stores data transferred from the PC/WS 61.

The core unit 60 controls data flows among the reader unit 61, the facsimile unit 64, the file unit 65, the computer interface unit 67, the formatter unit 68, and the image memory unit 69.

Figure 11:
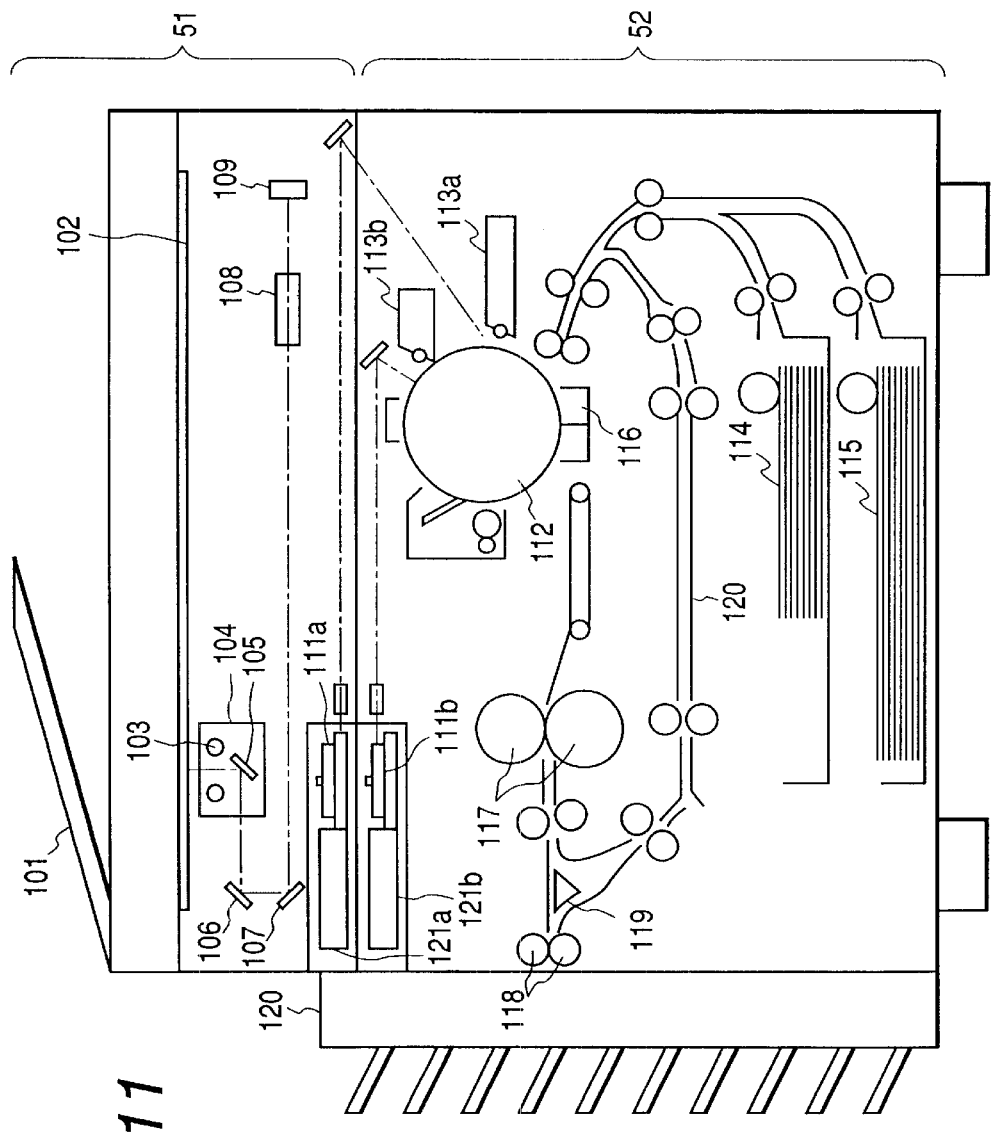
FIG. 11 is a view showing the image reading apparatus using the image sensor of the third embodiment.

FIG. 11 is a view showing the sectional structure of the reader unit 1 and printer unit 2 shown in FIG. 10.

Referring to FIG. 11, an original feeding device 101 of the reader unit 51 feeds originals (not shown) one by one from the last page onto a platen glass 102. The original on the platen glass 102 is discharged upon completion of original reading. When the original is conveyed onto the platen glass 102, a lamp 103 is turned on to start moving a scanner unit 104, thereby exposing and scanning the original.

Light reflected by the original upon exposure and scanning is guided to an image sensor 109 of the present invention through mirrors 105, 106, and 107, and a lens 108. The original image thus scanned is read by the image sensor 109. Image data output from the image sensor 109 is subjected to processing such as A/D conversion and shading correction and transferred to the printer unit 52 or core unit 60.

A laser driver 121 in the printer unit 52 drives a laser beam emission unit 111 to cause the laser beam emission unit 111 to emit a laser beam corresponding to the image data output from the reader unit 51. Different positions of a photosensitive drum 112 are irradiated with this laser beam, and a latent image corresponding to the laser beam is formed on the photosensitive drum 112.

A developing agent is applied to the latent portion of the photosensitive drum 112 by a developing unit 113. A printing paper sheet is fed from one of cassettes 114 and 115 to a transfer unit 116 at a timing synchronized with the start of laser beam irradiation. The developing agent attracted to the photosensitive drum 113 is transferred onto the printing paper sheet. The printing paper sheet with the developing agent is conveyed to a fixing unit 117. The developing agent on the printing paper sheet is fixed by heat and pressure in the fixing unit 117.

The printing paper sheet passing through the fixing unit 117 is discharged by discharge rollers 118. A sorter 120 sorts the discharged printing sheets to the corresponding bins. When sorting is not set in the sorter 120, the printed paper sheet is conveyed up to the discharge rollers 118. The rotational direction of the discharge rollers 118 is reversed, and the paper sheet is then fed to a refeed convey path 121 by a flapper 119.

In multiple printing, the paper sheet is guided to the refeed convey path 120 by the flapper 119 so as not to convey the paper sheet to the discharge rollers 118. The paper sheet guided to the refeed convey path 120 is fed to the transfer unit 116 at the same timing as described above.

An embodiment in which the image sensor of the present invention is applied to a sheet feed type image reading apparatus will be described as the fourth embodiment of the present invention with reference to FIGS. 12 and 13.

Figure 12:
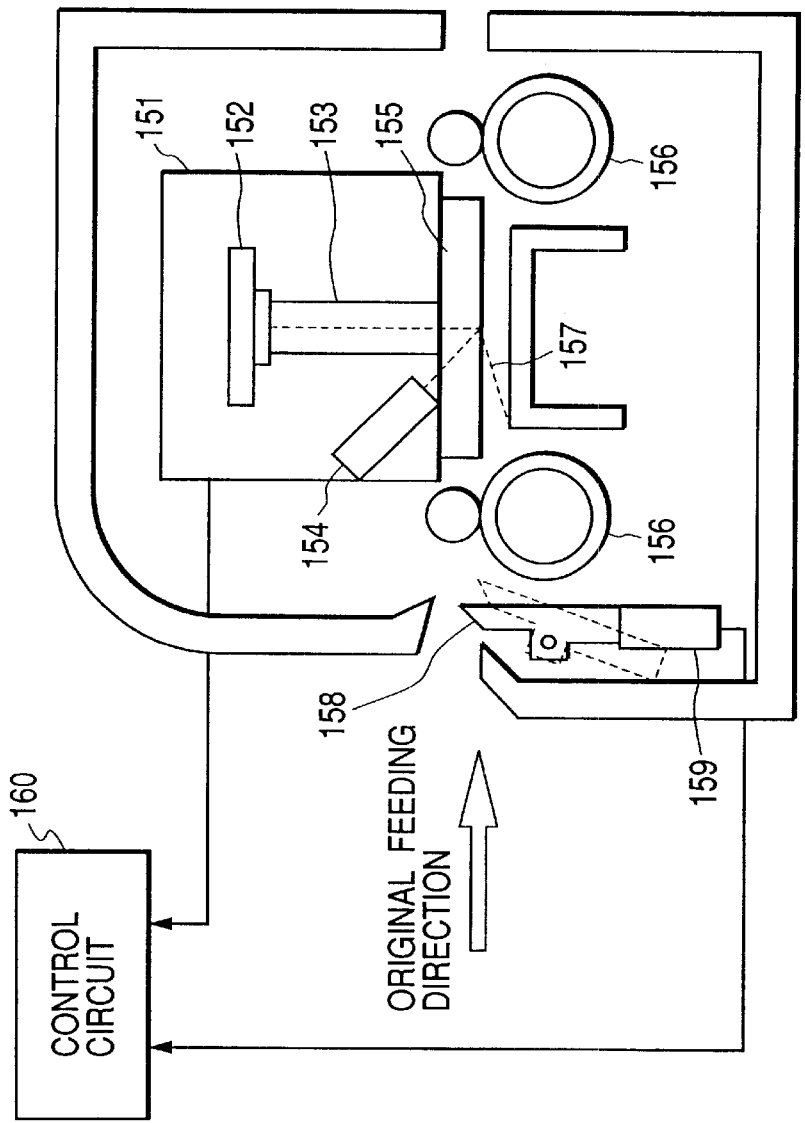
FIG. 12 is a view showing an image reading apparatus using an image sensor of the fourth embodiment.

FIG. 12 is a schematic view of the image reading apparatus for reading an original image. An image reading unit 151 comprises an image sensor 152, a SELFOC lens 153, an LED array 154, and a contact glass 155. Convey rollers 156 are disposed on the two sides of the image reading unit 151 and used to position an original. A contact sheet 157 is used to bring the original into contact with the image reading unit 151. A control circuit 160 processes signals from the image reading unit 151.

An original detection lever 158 is used to detect that an original has been inserted. When the lever 158 actually detects that an original has been inserted, the lever 158 is inclined to change the output from an original detection sensor 159. The detection state is transmitted to a CPU 215 in the control circuit 160, and the CPU 215 determines that the original has been inserted. The CPU 215 drives a motor (not shown) for driving the original convey rollers 156 to start feeding the original, thereby reading the image on the original.

Figure 13:
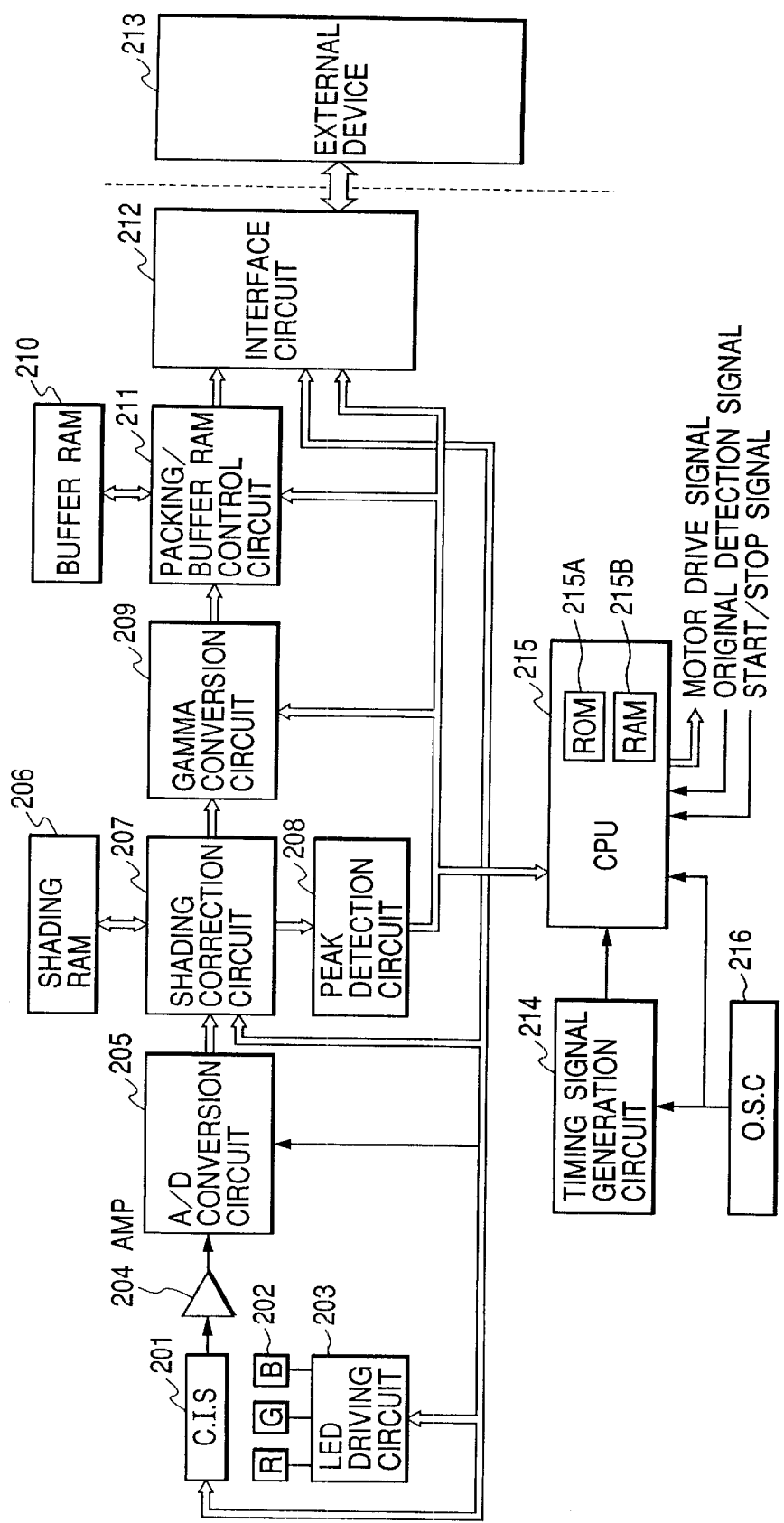
FIG. 13 is a diagram showing the image reading apparatus using the image sensor of the fourth embodiment.

FIG. 13 is a block diagram of the electrical arrangement to explain the control circuit shown in FIG. 12 in detail. The operation of the control circuit will be described with reference to FIG. 13.

Referring to FIG. 13, the image reading unit 151 in FIG. 12 is denoted by reference numeral 201. The image reading unit 151 (201 in FIG. 13) is formed integrally with LEDs 202 of R, G, and B serving as light sources. An LED control (driving) circuit 203 switches and turns on the LEDs 202 of R, G, and B in units of lines while an original is conveyed on the contact glass 155 of the image reading unit 151 (201 in FIG. 13). Therefore, a line sequential color image of R, G, and B can be read.

An AMP 204 amplifies a signal output from the image reading unit 201. An A/D conversion circuit 205 A/D-converts the output from the AMP 204 to obtain, e.g., an 8-bit digital output. A shading RAM 206 reads a calibration sheet in advance to store shading correction data. A shading correction circuit 207 performs shading correction of the image data read on the basis of the data from the shading RAM 206. A peak detection circuit 208 detects a peak value of the read image data in units of lines to detect the leading end of the original.

A gamma conversion circuit 209 converts the gamma value of the image data read in accordance with a gamma curve present by a host computer.

A buffer RAM 210 temporarily stores image data to match timings between the actual read operation and communication with the host computer. A packing/buffer RAM control circuit 211 performs packing in accordance with an image output mode (binary, 4-bit multilevel, 8-bit multilevel, or 24-bit multilevel) preset by the host computer. The circuit 211 then writes the data in the buffer RAM 210 and reads out the image data from the buffer RAM 210 and outputs the readout image data to an interface circuit 212.

The interface circuit 212 exchanges control signals with and outputs image signals to an external device (e.g., a personal computer) such as a host device for the image reading apparatus of this embodiment.

The CPU 215 is of, e.g., a microcomputer type and has a ROM 215A storing processing sequences and a work RAM 215B. The CPU 215 controls the respective components in accordance with the sequences stored in the RAM 215A.

A timing signal generation circuit 216 frequency-divides an output from an oscillator 216 in accordance with settings in the CPU 215 to generate various timing signals serving as operation reference signals. An external device 213 is connected to the control circuit via the interface circuit 213 and comprises a personal computer as an example.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image sensor including a plurality of photoelectric conversion devices each including a plurality of light-receiving elements, comprising:
   a scanning device adapted to read a signal from each of the light-receiving elements;
   a delay device adapted to delay a start signal for starting a read operation of signals from a plurality of light-receiving elements included in one of said plurality of photoelectric conversion devices; and
   a start signal switching device adapted to selectively output at least two types of start signals for starting a read operation of the signals from said plurality of light-receiving elements included in the next photoelectric conversion device before an end of the read operation of the signals from said plurality of light-receiving elements included in of one of said plurality of photoelectric conversion devices in accordance with changing of resolution.

2. A sensor according to claim 1, wherein said scanning means thins out outputs from the plurality of light-receiving elements.

3. A sensor according to claim 1, wherein said scanning means adds some of outputs from the plurality of light-receiving elements and reads the outputs.

4. An image reading apparatus comprising said image sensor of claim 1 and a lens arranged to focus an optical image onto said image sensor.

5. An apparatus according to claim 4, further comprising a light source adapted to irradiate light to an object.

6. An apparatus according to claim 5, further comprising an image forming unit adapted to transfer an image which is based on a signal output from said image sensor, onto a paper, and a feeding unit adapted to feed a paper onto which an image was transferred.

7. A sensor according to claim 1, wherein the plurality of types of start signals are output based on read-out timing of a signal from the light-receiving elements which is subjected to read-out before each of the light-receiving elements that is the last to be read out, and the at least two types of start signals are output based on different read-out timings of signals from different ones of the plurality of light-receiving elements in accordance with changing of the resolution.

8. A sensor according to claim 7, wherein said scanning device thins out outputs from the plurality of light-receiving elements.

9. A sensor according to claim 7, wherein said scanning means adds some of outputs from the plurality of light-receiving elements and reads the outputs.

10. An image sensor including at least a first photoelectric conversion device and a second photoelectric conversion device, wherein the first and second photoelectric conversion devices each include a plurality of light-receiving elements, and read-out of signals of the plurality of light-receiving elements included in said second photoelectric conversion device is started after signals of the plurality of light-receiving elements included in said first photoelectric conversion device are read out, comprising:

a scanning circuit provided to each of said first and second photoelectric conversion devices, adapted to read signals from the plurality of light-receiving elements in accordance with changing of a resolution; and a start signal control circuit adapted to control a start signal for the scanning circuit provided to said second photoelectric conversion device in accordance with changing of the resolution, wherein the start signal outputs before an end of a read operation of the scanning circuit provided to the first photoelectric conversion device.

11. A sensor according to claim 10, wherein said scanning circuit thins out outputs from the plurality of light-receiving elements.

12. A sensor according to claim 10, wherein said scanning circuit adds some of outputs from the plurality of light-receiving elements and reads the outputs.

13. A sensor according to claim 10, wherein said start signal control circuit controls to output the start signal in accordance with a scanning position of said scanning circuit provided to said first photoelectric conversion device, and wherein the scanning position changes in accordance with changing of the resolution.

14. A sensor according to claim 13, wherein said scanning circuit thins out outputs from the plurality of light-receiving elements.

15. A sensor according to claim 13, wherein said start timing control means changes the start timing on a start timing transmitting side.

16. A sensor according to claim 13, wherein said start timing control means changes the start timing on a start timing receiving side.

17. A method of driving an image sensor including of a plurality of photoelectric conversion devices each comprising a plurality of light-receiving elements, a scanning circuit adapted to read a signal from each of the light-receiving elements, and a resolution switching circuit adapted to switch a resolution of the signal read from each of the light-receiving elements, comprising the step of outputting a start signal for said scanning circuit of the next photoelectric conversion device before an end of read operation of said scanning means in accordance with a resolution.

18. A method according to claim 17, wherein each of the plurality of photoelectric conversion devices transmits a read timing to the next photoelectric conversion device in accordance with a predetermined light-receiving element read timing preceding a read timing of a final read light-receiving element of the plurality of light-receiving elements, and the predetermined light-receiving element read timing is switched in accordance with the resolution switching.

19. A photoelectric conversion device including a plurality of light-receiving elements, a scanning circuit adapted to read a signal from the each of the light-receiving elements, and a resolution switching circuit adapted to switch a resolution of the signal read from each of the light-receiving elements, wherein a start signal is output as a read timing signal in accordance with a read timing of a predetermined light-receiving element before a last read light-receiving element of the plurality of light-receiving elements, and the read timing is switched in accordance with switching of the resolution.

20. A photoelectric conversion device comprising a light-receiving element array in which a plurality of light-receiving elements are arranged, scanning means driven by a first shift register drive pulse for reading a signal from an odd-numbered light-receiving element of the light-receiving element array and a second shift register drive pulse for reading a signal from an even-numbered light-receiving element of the light-receiving element array, and resolution switching means for switching the resolution for each 1/N (N is a natural number), wherein the number of the plurality of light-receiving elements is a multiple of 2N.

21. A device according to claim 20, wherein a signal from the first light-receiving element of the light-receiving element array is read by the first shift register drive pulse, and a signal from a last light-receiving element of the light-receiving element array is read by the second shift register drive pulse.

22. An image sensor comprising a plurality of photoelectric conversion devices each including a light-receiving element array in which a plurality of light-receiving elements are arranged, scanning means driven by a first shift register drive pulse for reading a signal from an odd-numbered light-receiving element of the light-receiving element array and a second shift register drive pulse for reading a signal from an even-numbered light-receiving element of the light-receiving element array, and a resolution switching circuit adapted to switch the resolution for each 1/N (N is a natural number), wherein the number of the plurality of light-receiving elements is a multiple of 2N.

23. A sensor according to claim 22, wherein a signal from the first light-receiving element of the light-receiving element array is read by the first shift register drive pulse, and a signal from a last light-receiving element of the light-receiving element array is read by the second shift register drive pulse.

24. An image sensor including a plurality of photoelectric conversion devices each including a plurality of light-receiving elements, comprising:

a resolution switching device adapted to switch a resolution;

a control device, respectively, arranged in the photoelectric conversion devices, for changing a signal read from each of the light-receiving elements in accordance with the resolution switched by said resolution switching device; and a signal read device adapted to read the signal from each of the light-receiving elements in accordance with a plurality of pulses, wherein said signal read device periodically drives the plurality of pulses, and the number of light-receiving elements is set so that a signal read first from each said signal read device in each photoelectric conversion device is read using the same pulse of the plurality of pulses.

25. An image sensor including a plurality of photoelectric conversion devices each including a plurality of light-receiving elements, comprising:

a resolution switching device adapted to switch a plurality of resolutions changing every 1/N;

a control device provided to each of said plurality of photoelectric conversion devices adapted to change a signal read from each of the light-receiving elements in accordance with a resolution switched by said resolution switching device; and a signal read device adapted to read the signal from each of the light-receiving elements in accordance with M shift register drive pulses, said M being a positive integer, wherein the number of the plurality of light-receiving elements is a multiple of M×N.

26. An image reading apparatus comprising:

an image sensor including at least a first photoelectric conversion device and a second photoelectric conversion device, wherein the first and second photoelectric conversion devices each including a plurality of light-receiving elements, and read-out of signals of the plurality of light-receiving elements included in said second photoelectric conversion device is started after signals of the plurality of light-receiving elements included in said first photoelectric conversion device are read out, said image sensor comprising:

a scanning circuit provided to each of said first and second photoelectric conversion devices, adapted to read signals from the plurality of light-receiving elements in accordance with changing of a resolution; and a start signal control circuit adapted to control a start signal the scanning circuit provided to said second photoelectric conversion device in accordance with changing of the resolution, wherein the start signal outputs before an end of a read operation of the scanning circuit provided to the first photoelectric conversion device; and a lens adapted to focus on optical image onto said image sensor.

27. An apparatus according to claim 26, further comprising a light source adapted to irradiate light to an object.

28. An apparatus according to claim 27, further comprising an image forming unit adapted to transfer an image which is based on a signal output from said image sensor, onto a paper, and a feeding unit adapted to feed a paper onto which an image was transferred.

29. A sensor according to claim 1, wherein said scanning device, said display device and said start signal switching device are provided to each of said plurality of photoelectric conversion devices.

* * * * *

UNITED STATES PATENT AND TRADEMARK OFFICE
CERTIFICATE OF CORRECTION

PATENT NO.   : 6,473,538 B2
DATED        : October 29, 2002
INVENTOR(S)  : Hiraku Kozuka It is certified that error appears in the above-identified patent and that said Letters Patent is hereby corrected as shown below:

Column 12,
Line 49, "resolution." should read -- a resolution. --;
Lines 51 and 54, "means" should read -- device --; and
Line 67, "on" should read -- on a -- .

Column 13,
Line 10, "means" should read -- device --;
Lines 49 and 52, "timing control means changes the" should read -- signal control circuit changes a --; and
Line 54, "of" (second occurrence) should be deleted.

Column 14,
Line 19, "means" should read -- circuit --;
Line 24, "resolution" should read -- a resolution --;
Line 25, "means for switching" should read -- circuit adapted to switch --; and
Line 38, "scanning means" should read -- a scanning circuit --.

Column 16,
Line 10, "signal" should read -- signal, --; and
Line 16, "on" should read -- an --.

Signed and Sealed this

Ninth Day of September, 2003

JAMES E. ROGAN
*Director of the United States Patent and Trademark Office*